United States Patent [19]
Höls

[11] Patent Number: 6,071,551
[45] Date of Patent: Jun. 6, 2000

[54] PROCESS FOR PRODUCING PLASTIC FILMS USEFUL FOR PRODUCING PLASTIC FILM CAPACITORS AND PROCESS FOR PRODUCING PLASTIC FILM CAPACITORS BY MEAN OF SUCH PLASTIC FILMS

[75] Inventor: Lothar Höls, Düren, Germany

[73] Assignee: Aluminium Feron GmbH & Co., Duren, Germany

[21] Appl. No.: 09/011,309

[22] PCT Filed: Aug. 3, 1996

[86] PCT No.: PCT/DE96/01448

§ 371 Date: Feb. 5, 1998

§ 102(e) Date: Feb. 5, 1998

[87] PCT Pub. No.: WO97/06203

PCT Pub. Date: Feb. 20, 1997

[30] Foreign Application Priority Data

Aug. 7, 1995 [DE] Germany ............... 195 28 929

[51] Int. Cl.⁷ .............. B05D 5/12; H01G 41/20
[52] U.S. Cl. .......... 427/79; 427/393.5; 427/412.1; 361/311; 361/301.4
[58] Field of Search ................ 427/79, 393.5, 427/412.1; 341/301.3, 301.4, 301.1, 311; 156/307.4, 307.5, 307.7

[56] References Cited

U.S. PATENT DOCUMENTS

| | | | |
|---|---|---|---|
| 5,004,649 | 4/1991 | Yamasaki et al. | 428/461 |
| 5,199,274 | 4/1993 | Kinuta et al. | 361/525 |
| 5,494,727 | 2/1996 | Kinoshita . | |
| 5,540,974 | 7/1996 | Hoseki et al. | 478/141 |

FOREIGN PATENT DOCUMENTS

| | | |
|---|---|---|
| 0 665 563 A1 | 2/1995 | European Pat. Off. . |
| 32 29 292 C2 | 1/1986 | Germany . |
| 43 39 951 A1 | 1/1995 | Germany . |
| 6020868 | 1/1994 | Japan . |

Primary Examiner—Kristine Kincaid
Assistant Examiner—Eric W. Thomas
Attorney, Agent, or Firm—Herbert Dubno

[57] ABSTRACT

A plastic film for use in a film capacitor is made by coating a backing film with a layer of polymerizable compounds which are dried but not reacted on the backing film. To this coating a metal layer is applied and the backing film with the metal layer thereon is superposed with other portions of such film and backing layers and pressed at a reaction temperature capable of cross-linking the compounds and effecting polymerization to yield a capacitor of high resistance to moisture.

19 Claims, No Drawings

PROCESS FOR PRODUCING PLASTIC FILMS USEFUL FOR PRODUCING PLASTIC FILM CAPACITORS AND PROCESS FOR PRODUCING PLASTIC FILM CAPACITORS BY MEAN OF SUCH PLASTIC FILMS

CROSS REFERENCE TO RELATED APPLICATIONS

This application is a national stage of PCT/DE96/01448 filed Aug. 3, 1996 and based, in turn, on German national application 195 28 929.3 of Aug. 7, 1995 under the International Convention.

FIELD OF THE INVENTION

The present invention is directed to a process for producing plastic films useful for the production of film capacitors.

BACKGROUND OF THE INVENTION

It is known to produce film capacitors by providing a plastic backing film with a metal coating on one side or both sides. Aluminum or its alloys can be used as a suitable metal. The metal is preferably vaporized by deposition on the backing film. The obtained metal-coated plastic film is used as a starting material in order to press several film portions one upon the other for the production of a package. The several film portions are thereby bonded to one another so that a unitary capacitor package is obtained. The steps which are necessary for the production of the electrode terminals are not mentioned in detail here since they are of no importance for the invention described in the following.

Because of the vaporized metal layers such capacitors have only a limited moisture resistance. Corrosion problems arise since moisture enters betweens the vaporized metal layer and the plastic backing film. Accordingly, although these capacitors are relatively inexpensive to produce, they have, however, only a limited durability.

Such capacitors are encapsulated for improving the moisture resistance. This has the disadvantage that these capacitors cannot be used as chips in the surface installation on account of geometrical reasons. Moreover, such capacitors have only a limited adaptability to necessary soldering methods.

In order to increase the moisture resistance of such film capacitors the Japanese disclosure letter (Kokai) 6-20868 provides the plastic backing film with a coating on water basis in the form of an aqueous solution or an aqueous dispersion. The extruded plastic backing film is longitudinally stretched. Then one side or both sides of the film are either successively or continuously provided with water-based coating in the form of an aqueous solution or an aqueous dispersion. Thereafter, a heat treatment is carried out. Finally, the coating is dried simultaneously with stretching of the film in a traverse direction. Thereafter, the product is subjected to a heat treatment at temperatures of 230° C. A surface-modified plastic film is generated which has a total thickness of 1.0–15 $\mu$m, wherein the coating on one side has a thickness of 0.03–0.3 $\mu$m.

Then the surface-modified starting film produced in this manner is provided with a metal coating on one side or on both sides in the customary manner. Then the metal-coated films are pressed for the generation of capacitor packages.

Capacitors produced from such films have a better resistance to moisture than capacitors produced from backing films which have not been treated.

OBJECT OF THE INVENTION

It is an object of the invention to provide a process for the production of plastic films useful for the production of film capacitors which have an especially good moisture resistance.

SUMMARY OF THE INVENTION

According to the invention the above-cited problem is solved by a process for producing plastic films useful for the production of film capacitors, said process comprising the following steps:

a) Providing a plastic backing film;

b) producing a solution or a dispersion of compounds which are polymerizable, especially through cross-linking reactions, at an increased reaction temperature lying above the drying temperature of the coating;

c) applying the solution or dispersion to one side or to both sides of the plastic backing film for the production of a coating; and d) drying the coating.

The gist of the invention is that the coating applied onto the plastic backing film with the inventive process is still reactive after drying upon the influence of heat. In other words, compounds contained within the coating are polymerizable, especially through cross-linking reactions, at an increased reaction temperature above the drying temperature of the coating. This polymerization reaction is initiated by the pressing of several film portions for the generation of a capacitor package at increased temperatures after the application of the metal layer onto the plastic backing film provided with the coating. Temperatures above 120° C., especially above 160° C., are used with this pressing process which is not new per se and which is also carried out with the processes of the prior art. The polymerization reaction is initiated. With continuing reaction the coating is cured. This process is not reversible so that higher temperatures which are generated during the later operation of the capacitors have no effects.

Furthermore, the higher temperatures during the production process of the capacitors of above 120° C. with simultaneous application of pressure cause a plastification of the coating and thus a heat-seal effect between the metal layer and the plastic backing film provided with the coating.

On the whole, both processes result in an improved adhesion between the metal layer and the backing film as well as in an improved moisture resistance of the final product since practically no moisture can enter between the metal layer and the backing film. Accordingly, the capacitors have increased durability.

While, according to the teaching of the above-cited prior art (Japanese disclosure letter (Kokai) 6-20868) all reactive substances have already reacted or have had their reactions initiated by the heat treatment (at 230° C.) after the drying of the applied coating, the coating applied according to the invention, which does not make necessary an additional heat treatment apart from drying, still contains reactive groups. The reaction of these groups is only initiated during the pressing of the films for the production of capacitor packages to yield the above-cited advantages.

Preferably, plastic films having a total thickness of 0.1 to 15 $\mu$m are produced. The inventive process is especially suited for the production of thin films, especially of films having a total thickness of 0.1 to 4 $\mu$m. Capacitors made therefrom have an especially good moisture resistance. Practically, the produced coatings have a thickness of 0.03 to 2 $\mu$m, preferably of 0.03 to 0.3 $\mu$m.

It is essential with the inventive process that the drying temperature be below the polymerization temperature. Accordingly, the coating applied to the backing film is dried only with slight heating, preferably at a drying temperature 100° C. It is essential that the polymerization reaction is not initiated by the drying process. This initiation is to be realized by the pressing process carried out later during the production of the capacitors.

Preferably, a PET (polyethylene terephthalate) film or a PEN (polyethylene naphthalate) film is used as backing film with the inventive process. However, for instance PPS (polyphenylene sulfide) films, polysulfone films, polypropylene films, polyimide films or combinations thereof are suitable too. The use of other backing films is not excluded.

When producing the solution for the application of the coating the starting compounds are preferably predissolved in solvents and thereafter mixed with one another. Practically, the solution is produced by means of an organic solvent. The use of aqueous solvents is not excluded.

If necessary, lacquer auxiliaries, as anti-oxidants, light protection agents, fillers, especially silicic acids, etc. are added to the starting compounds.

An especially preferred embodiment of the inventive process is characterized by producing a solution or a dispersion of compounds containing OH-groups and/or compounds containing amino groups and compounds containing blocked isocyanate groups which through the effect of heat by cross-linking reactions result in polyurethane structures.

After the drying of the coating furthermore blocked isocyanate groups are present which, through the effect of heat, can react with the OH-groups and/or amino groups of the remaining compounds. As mentioned above, this reaction takes place after the application of the metal layer onto the plastic backing film provided with the coating through the pressing of several film portions for the generation of a capacitor package at the mentioned increased temperatures. At these temperatures the reactive process between the OH-groups and/or amino groups of the compounds (resins) and the blocked isocyanates is initiated wherein the coating is cured with continuing reaction.

Preferably, cross-linking baking polyurethane resins are used as blocked isocyanate groups containing compounds. Preferably, polyvinyl butyral resins or epoxy resins are used as OH-groups containing compounds and/or amino groups containing compounds.

As mentioned above, film capacitors can be produced with the plastic backing foils produced according to the invention which are characterized by an especially good moisture resistance. On account of this good moisture resistance an encapsulation can be omitted. Accordingly, the films can be used for non-encapsulated chips and fulfill the requirement of the surface installation. Furthermore, they are especially good for the corresponding soldering methods (wave mode method at 260° C. and reflux mode method at 235° C.).

Moreover, the invention is directed to the plastic film produced and to a process for the production of film capacitors. This process includes the following steps:
 a) Applying metal layers onto the plastic films provided with the coatings; and
 b) pressing several superposed metal-coated plastic film portions for the generation of a capacitor package at a temperature corresponding to the polymerization temperature of the coating substances or lying above the same.

As already mentioned above, a polymerization of the coating substances and thus a final curing of the coating is achieved by pressing the plastic film portions at the polymerization temperature of the coatings or thereabove. When pressing, the films are intimately joined with one another whereby any remaining air bubbles are pressed out or are filled with material. The residual moisture which is still present is also eliminated so that a homogeneous structure is obtained. A polymerization or cross-linking process is connected therewith.

Accordingly, in contrast to the above-cited prior art, with the inventive process the coatings cure finally only during the pressing process for the production of the capacitor packages. This has the advantage that cavities which are possibly still contained within the coatings with entrapped moisture are eliminated by the polymerization reaction taking place during the pressing step. By this, an especially tight bond between coating and metal layer with especially good adhesion effect results. The resulting compound has only a very small moisture content and the later entry of moisture is prevented. The solderability is especially good.

Preferably, the pressing step is carried out at a temperature $\geq 120°$ C. An exact adjustment of the temperature for pressing can be selected for the respective polymerization temperature of the coating substances.

If necessary, the temperature can be continuously or discontinuously increased, or also decreased, during the pressing step.

Finally, the invention is directed to a film capacitor produced by the process.

Preferably baking polyurethane resins are used as isocyanate-group-containing compounds in which the isocyanate groups are blocked according to the known processes and are reacted only by the effect of higher temperatures. Preferably, polyvinyl acetates are used as OH-group-containing compounds. Furthermore, reaction products of OH-group-containing compounds and epoxy-group-containing compounds or their mixtures in connection with melamine resins or benzoguanamine resins are suited for the desired characteristics. The reactivity of these compounds with the influence of temperature can be controlled by the incorporation of blocked acid catalysts.

The invention is illustrated by the examples below.

EXAMPLE 1

A polyvinyl butyral resin having a softening point according to DIN ISO 426 of 180–200 and a content of polyvinyl alcohol of 18–21% was dissolved in ethanol in a ratio of 80% by weight ethanol and 20% by weight resin. 20 parts of this solution were mixed 80 parts of an ester base solvent, for instance acetic acid ethylester. Subsequently, 0.6 parts of a cross-linking baking urethane resin on the basis of hexamethylene diisocyanate dissolved in a solvent with 75% by weight resin and 25% by weight solvent, with an equivalent weight of 378 were added. By means of a laboratory coater the coating mass was applied to a PEN film with a thickness of 4 $\mu$m in such a manner that a dry coating mass on the polyester film of about 0.2 g/m$^2$ resulted. After the evaporation process of the solvent with slight heating of 30° C. a block-free coating of about 5 g/m$^2$ on the film surface resulted which was applied on one side. In a second coating process the backside of the polyester film was coated with the coating mass and dried according to the above-described process.

EXAMPLE 2

The mixture produced according to example 1 was applied to a polyethylene naphthalate film with a thickness of 2 $\mu$m by means of a laboratory coater in such a manner that a wet application weight of 5 g/m$^2$ resulted. The layer was dried at 80° C. until all the solvents were evaporated, and the process was repeated on the backside of the polyethylene naphthalate film. A film for the production of film capacitors resulted which was provided on both sides with a functional layer.

EXAMPLE 3

An epoxy resin having a melting point according to the capillary method DIN 53736 of 65–80° C. and an epoxy value of 0.1 to 0.11 was dissolved in an organic solvent, for instance acetic acid ethylester, for 5% by weight. 1.8% by weight of an aromatic cross-linking baking polyurethane resin, dissolved for 85% by weight in a mixture of methoxypropyl acetate-2 and xylene in a ratio of 1:1, with a viscosity at 23° C. according to DIN 53019/1 of 21000+−800 mPas and an equivalent weight of 875 were added to this solution. This coating mass was applied to a polyester film having a thickness of 3.5 $\mu$m with a wet application weight of 15 g/m$^2$ by means of a laboratory coater and was dried at 60° C. so long until all the solvents were evaporated. In a further step the backside of the coated film was coated according to the same process. A film for the production of film capacitors which was provided with a functional layer on both sides resulted.

The films coated according to the above-described process were vapor-coated with aluminum in a further process step and further processed to obtain capacitors. For comparison purposes capacitors were produced which had a respective capacity of 0.1 $\mu$F. The temperatures of above 160° C. occurring during the production process of the capacitors with simultaneous application of pressure caused on the one side a plastification of the coating and thus a heat seal effect between the vapor-deposited aluminum and the coated film and on the other side an initiation of the reactive process between the OH-groups or amino groups of the resin and the blocked isocyanate.

The vaporized aluminum layer without the influence of temperature showed bad adhesion characteristics on the substrate and after initiation by temperatures of 160° C. at a certain dwell time a drastic increase of adhesion.

The produced capacitors were supplied with a voltage of 70 V/$\mu$m and were exposed to a climate of 60° C. and 95% relative humidity. The average durability of the examined capacitors is shown in the following table.

| | |
|---|---|
| Capacitor without coating | 750 h |
| Capacitor according to example 1 | 1200 h |
| Capacitor according to example 2 | 2100 h |
| Capacitor according to example 3 | 1700 h |

EXAMPLE 4

According to this example the solderability of stack capacitors or laminated capacitors is compared. The suitability of an electrical capacitor as chip member depends on the scope of the electrical modifications which are caused by the soldering process when the members are fixed on the circuit boards.

According to the experiment which is described here modifications of this kind at chip capacitors with coated and non-coated dielectric (4.0 $\mu$m polyethylene terephthalate foil) were compared with one another. Two soldering processes were simulated, respectively, namely reflux mode soldering and wave mode soldering, according to which the heat of the liquid solder and the duration of the process are different. During the reflux mode and wave mode soldering the capacitors are subjected to temperatures of 235° C. and 260° C., respectively.

The measurement results of the tests are shown in the following table. They show a dependence of the electrical characteristics of the chip capacitors (capacity change $\Delta$ C/C) on the duration of the additional heat effect caused by the soldering.

| Soldering duration at 235° C. | [s] | +10 | +30 | +80 | +180 | +300 |
|---|---|---|---|---|---|---|
| Total soldering duration | [s] | 10 | 40 | 120 | 300 | 600 |
| With coating | | + | + | + | + | + |
| Without coating | | + | + | − | − | − |
| Soldering duration at 260° C. | [s] | +5 | +10 | +15 | +30 | |
| Total soldering duration | [s] | 5 | 15 | 30 | 60 | |
| With coating | | + | + | + | + | |
| Without coating | | − | − | − | − | |

+: $\Delta C/C<5\%$
−: $\Delta C/C>5\%$
according to example 1

What is claimed is:

1. A process for making a plastic film for use in a film capacitor comprising the steps of:
   (a) providing a plastic backing film;
   (b) forming a liquid which is a solution or dispersion of compounds polymerizable at a reaction temperature above a drying temperature of the liquid;
   (c) applying a layer of said liquid on at least one side of said plastic backing film; and
   (d) drying said layer at said drying temperature to coat said plastic backing film with a coating polymerizable at a temperature at least equal to said reaction temperature.

2. The process defined in claim 1 wherein said compounds, polymerizable at said reaction temperature are capable of cross linking at said reaction temperature and the plastic film with said coating has a total thickness of 0.1 to 15 $\mu$m.

3. The process defined in claim 2 wherein said total thickness is 0.1 to 4 $\mu$m.

4. The process defined in claim 2 wherein said coating has a thickness of 0.03 to 2 $\mu$m.

5. The process defined in claim 4 wherein said coating has a thickness of 0.03 to 0.3 $\mu$m.

6. The process defined in claim 1 wherein said drying temperature is at most 100° C.

7. The process defined in claim 6 wherein said plastic backing film is composed of polyethylene teraphthalate or polyethylene naphthalate.

8. The process defined in claim 1 wherein, in step (b), said compounds are predissolved in solvents and the solvents are mixed together to form said liquid.

9. The process defined in claim 8 wherein said solvents are organic solvents.

10. The process defined in claim 1, further comprising adding to said liquid at least one liquor auxiliary, antioxidant, light protection agent or filler.

11. The process defined in claim 1 wherein said compounds contain hydroxyl or amino groups and blocked isocyanate groups capable of cross-linking at said reaction temperature to form polyurethane compounds.

12. The process defined in claim 11 wherein said compounds containing blocked isocyanate groups are baking polyurethane resins.

13. The process defined in claim 11 wherein said compounds containing hydroxyl groups or amino groups are polyvinyl butyryl resins or epoxy resins.

14. A plastic film as made by the process defined in claim 1.

15. A process for making a film capacitor comprising the steps of:
(a) providing a plastic backing film;
(b) forming a liquid which is a solution of dispersion of compounds polymerizable at a reaction temperature above a drying temperature of the liquid;
(c) applying a layer of said liquid on at least one side of said plastic backing film;
(d) drying said layer at said drying temperature to coat said plastic backing film with a coating polymerizable at a temperature at least equal to said reaction temperature;
(e) applying a metal layer to said coating;
(f) forming a plurality of metal-coated plastic film portions from the plastic backing film provided with said coating and said metal layer;
(g) superposing said plurality of portions;
(h) pressing said plurality of portions at a temperature equal to at least said reaction temperature to effect polymerization of said compounds and bonding of said portions and said metal layer of said portions together.

16. A film capacitor made by the process of claim 15.

17. The process defined in claim 15 wherein said drying temperature is at most 100° C. and said reaction temperature is at least 120° C.

18. The process defined in claim 15, further comprising the step of continuously increasing the temperature of the superposed portions during the pressing thereof.

19. The process defined in claim 15, further comprising the step of discontinuously increasing the temperature of the superposed portions during the pressing thereof.

* * * * *